US007603459B2

(12) United States Patent
Alam et al.

(10) Patent No.: US 7,603,459 B2
(45) Date of Patent: Oct. 13, 2009

(54) SYSTEM, METHOD AND PROGRAM TO TROUBLESHOOT A DISTRIBUTED COMPUTER SYSTEM OR DETERMINE APPLICATION DATA FLOWS

(75) Inventors: A.K.M Kamrul Alam, Longmont, CO (US); Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 10/940,471

(22) Filed: Sep. 14, 2004

(65) Prior Publication Data

US 2006/0075089 A1 Apr. 6, 2006

(51) Int. Cl.
*G06F 15/173* (2006.01)
(52) U.S. Cl. .................. 709/224; 709/223; 370/231
(58) Field of Classification Search ............... 709/224, 709/223; 370/231
See application file for complete search history.

(56) References Cited

U.S. PATENT DOCUMENTS

| | | | | |
|---|---|---|---|---|
| 5,430,709 | A * | 7/1995 | Galloway | 370/241 |
| 6,031,978 | A * | 2/2000 | Cotner et al. | 709/248 |
| 6,233,542 | B1 | 5/2001 | Butts et al. | 703/27 |
| 6,341,312 | B1 | 1/2002 | French et al. | 709/227 |
| 6,363,391 | B1 * | 3/2002 | Rosensteel, Jr. | 707/102 |
| 6,397,253 | B1 | 5/2002 | Quinlan et al. | 709/227 |
| 6,421,688 | B1 * | 7/2002 | Song | 707/203 |
| 6,510,151 | B1 * | 1/2003 | Cioli et al. | 370/352 |
| 6,625,648 | B1 * | 9/2003 | Schwaller et al. | 709/224 |
| 6,757,733 | B2 * | 6/2004 | Gupta | 709/229 |
| 6,826,606 | B2 * | 11/2004 | Freeman et al. | 709/223 |
| 6,901,051 | B1 * | 5/2005 | Hou et al. | 370/231 |
| 6,988,140 | B2 * | 1/2006 | Chintalapati et al. | 709/227 |
| 6,996,615 | B1 * | 2/2006 | McGuire | 709/226 |
| 7,065,566 | B2 * | 6/2006 | Menard et al. | 709/223 |
| 7,152,111 | B2 * | 12/2006 | Allred et al. | 709/227 |
| 2002/0040441 | A1 * | 4/2002 | See et al. | 713/202 |
| 2002/0055982 | A1 * | 5/2002 | Goddard | 709/217 |
| 2002/0156897 | A1 * | 10/2002 | Chintalapati et al. | 709/227 |
| 2002/0174195 | A1 * | 11/2002 | Meyer et al. | 709/219 |

(Continued)

OTHER PUBLICATIONS

Security Guide (Red Hat, 2001).*

*Primary Examiner*—Saleh Najjar
*Assistant Examiner*—Waseem Ashraf
(74) *Attorney, Agent, or Firm*—Arthur J. Samodovitz

(57) ABSTRACT

A system, method and computer program product for determining active connections likely needed to handle client requests. First program instructions repeatedly detect active connections between a first server and other servers. Second program instructions determine how often an active connection between the first server and each of the other servers has been detected. Third program instructions determine when each of the active connections was last detected. Fourth program instructions form a table listing the active connections, how often or how frequently each of the active connections has been detected, and when each of the active connections was last detected. Preferably, the fourth program instructions highlight in the table one or more of the active connections which were not detected as active during a most recent iteration by the first program instructions. Fifth program instructions identify a plurality of the active connections which do not utilize ports generally used for system functions or ports generally used to receive requests from user clients. This plurality of active connections are more likely to be needed to handle client requests.

13 Claims, 2 Drawing Sheets

U.S. PATENT DOCUMENTS

| | | | |
|---|---|---|---|
| 2003/0140251 A1* | 7/2003 | Marin et al. | 713/201 |
| 2003/0154269 A1* | 8/2003 | Nyanchama et al. | 709/223 |
| 2004/0044771 A1* | 3/2004 | Allred et al. | 709/227 |
| 2004/0049579 A1* | 3/2004 | Ims et al. | 709/225 |
| 2004/0083317 A1* | 4/2004 | Dickson et al. | 710/22 |
| 2005/0028164 A1* | 2/2005 | Neuwald et al. | 719/310 |
| 2005/0198314 A1* | 9/2005 | Coon et al. | 709/228 |

* cited by examiner

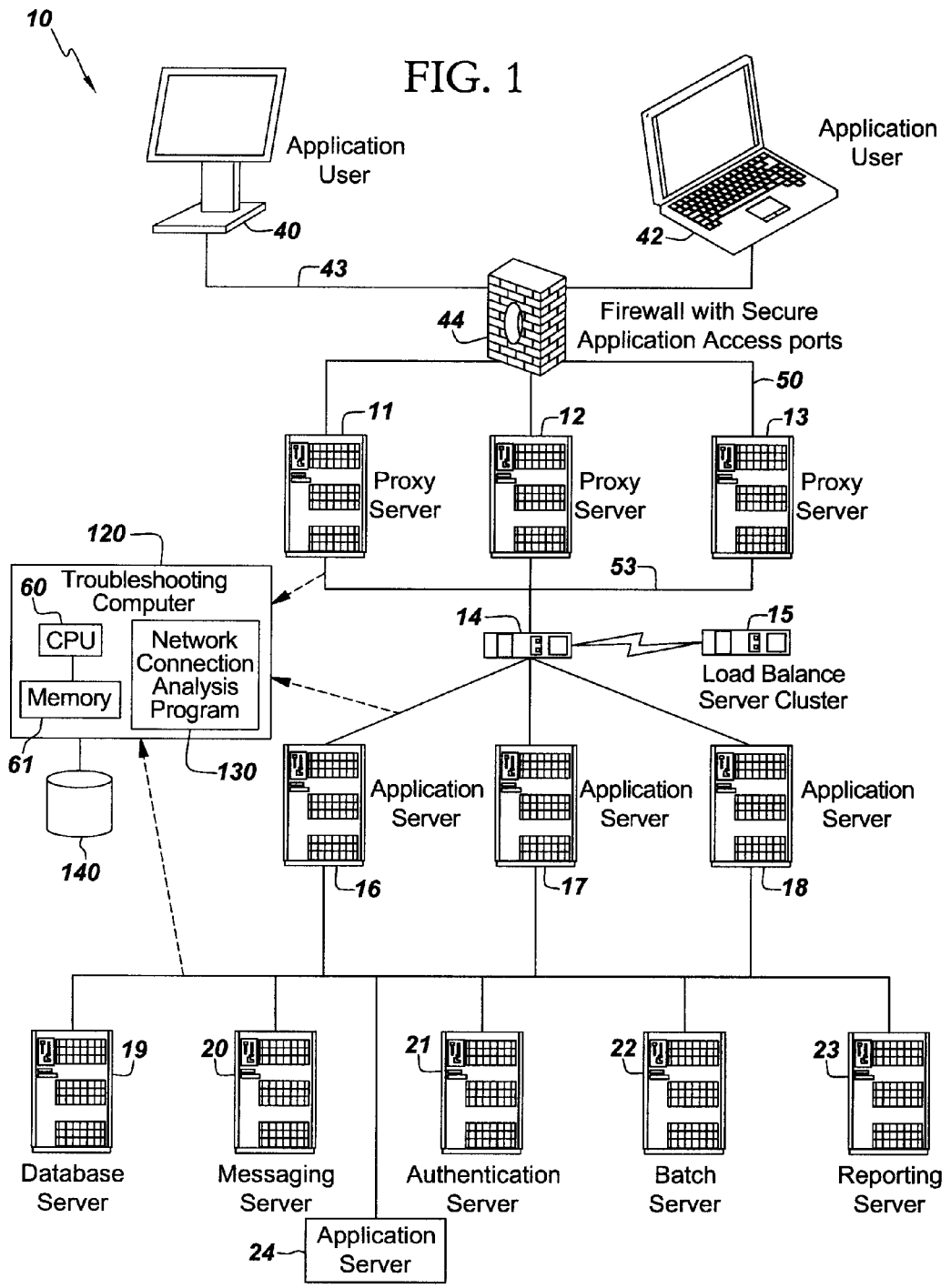

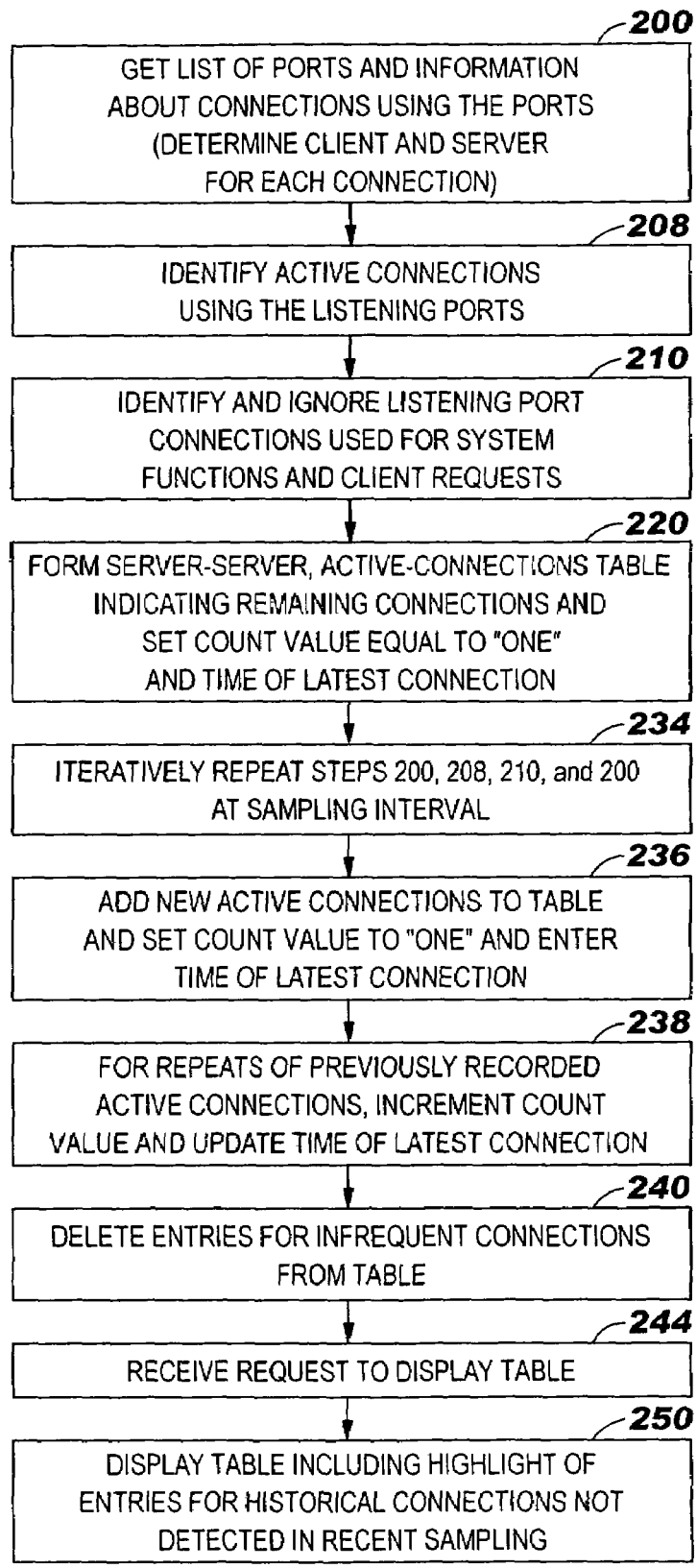

SYSTEM, METHOD AND PROGRAM TO TROUBLESHOOT A DISTRIBUTED COMPUTER SYSTEM OR DETERMINE APPLICATION DATA FLOWS

FIELD OF THE INVENTION

The invention relates generally to distributed computer systems, and deals more particularly with a technique to troubleshoot a problem in a distributed computer system or determine application data flows.

BACKGROUND OF THE INVENTION

Distributed computer systems are well known today. They may comprise multiple servers interconnected via networks to handle client workstations. For example, a client workstation requests a web service and the request is forwarded from a proxy server to a web server in the distributed computer system. The web server itself may not possess all the applications or data to fully respond to the client request. In such a case, the web server may forward part or all of the client request to another server or generate another request for the other server to obtain the requisite service or data. For example, the client request can be to make travel reservations involving airplane tickets, hotel reservations and a rent-a-car, and a (front end) web server acts as the interface to the client. Upon receiving the request from the client for airplane tickets, the front end web server may forward the request, via a network, to another server on which an airplane reservation application runs. Likewise, upon receiving the request from the client for hotel reservations, the front end web server may forward the request, via another network, to another server on which a hotel reservation application runs. Likewise, upon receiving the request from the client for a rent-a-car, the front end web server may forward the request, via another network, to another server on which a rent-a-car application runs. In this example, each of these other servers does not itself manage the corresponding database, so each of these other servers requests the corresponding data (i.e. availability, pricing, etc.) from a respective database, via respective networks. Thus, in this example, multiple servers may be required to respond to the customer request for a compound travel reservation. Likewise, other types of server applications, such as a messaging server, an authentication server, a batch server or a reporting server, may be required to assist an application server in handling a client request.

To successfully respond to the customer request for compound travel reservations (or to a customer request for another service requiring assistance from other types of server applications), all of the requisite servers must be operating, and all of the network connections between them must be active. (if any of the servers is in a cluster, then at least one server in the cluster must be operating.) Occasionally, one or more of the servers (or server clusters) or the network connections between the servers (or server clusters) fails. The point of failure or even the nature of the failure may not be apparent to a systems administrator responsible for troubleshooting the problem. The troubleshooting task is compounded by the fact that there may be hundreds of active ports and network connections at any one time between the servers. Also, changes in configuration of the distributed computer system may have been made, but not reflected in troubleshooting documentation. So, it may be difficult to determine which servers to troubleshoot.

Accordingly, an object of the present invention is to facilitate the identification of a network connection or associated server which has failed.

SUMMARY OF THE INVENTION

The invention resides in a system, method and computer program product for determining active connections likely needed to handle client requests. First program instructions repeatedly detect active connections between a first server and other servers. Second program instructions determine how often an active connection between the first server and each of the other servers has been detected. Third program instructions determine when each of the active connections was last detected. Fourth program instructions form a table listing the active connections, how often or how frequently each of the active connections has been detected, and when each of the active connections was last detected. Preferably, the fourth program instructions highlight in the table one or more of the active connections which were not detected as active during a most recent iteration by the first program instructions.

According to features of the present invention, other program instructions identify a plurality of the active connections which do not utilize ports generally used for system functions or ports generally used to receive requests from user clients.

BRIEF DESCRIPTION OF THE FIGURES

FIG. 1 is a block diagram of a distributed computer system in which the present invention is incorporated.

FIG. 2 is a flow chart illustrating operation of a network connection analysis program within a troubleshooting computer of the distributed computer system of FIG. 1.

DETAILED DESCRIPTION OF THE PREFERRED EMBODIMENTS

The present invention will now be described in detail with reference to the figures. FIG. 1 illustrates a distributed computer system 10 which comprises proxy servers 11-13, a load balancing server 14 (with backup load balancing server 15), a cluster of associated application servers 16-18, a database server 19, a messaging server 20, an authentication server 21, a batch server 22, a reporting server 23 and another application server 24. Client computers 40 and 42 on an intranet 43 access proxy servers 11, 12 and 13 via a firewall 44 and a network 50 (such as the Internet). A network 52, such as a TCP/IP network, LAN or WAN, connects proxy servers 11, 12 and 13 to load balancing servers 14 and 15. The proxy servers may reside at the home page URL of the web site, and forward a client request to an application specified as a qualifier in the URL. In the illustrated example, application servers 16-18 are organized in a cluster. The nature of the application servers 16-18 is not important to the present invention, although they may rely on other of the servers 19-23 for a service to handle a client request. A network 54, such as a TCP/IP network, LAN or WAN, connects application servers 16-18 to servers 19-24. The database server 19 manages a database which may store data needed by application servers 16-18 to respond to a client request. Messaging server 20 queues and passes messages (such as data) between applications (such as IBM MQ Series software). Authentication server 21 handles authentication/login requests from applications and users. Batch server 22 performs batch processing of serialized requests. Reporting server 23 gathers miscellaneous application statistics data such as access rate and usage. Application server 24 provides additional services needed by application servers 16-18 to respond to client requests. Other types of servers may cooperate with application servers 16-18 to handle a client request.

As described in more detail below, the various servers communicate with each other by establishing active, network connections. Each network connection can be represented by pair of sockets—local and foreign. A "socket" is a combination of a network address and a port and represents one end of a connection. Each "connection" is directional. One socket is a "server" socket—i.e. a socket that accepts (serves) requests. The other socket is a "client" socket—i.e. one that initiates/sends request. The port for each "server" socket is always fixed and predetermined by an application. The identity (typically a number) of each of many server socket ports is known by "clients", so they address their requests to the proper server port. Examples of server ports are "80" for http requests and "443" for https requests. A port of a "client" socket is assigned by the client operating system randomly.

A network connection analysis program 130 runs on a troubleshooting computer 120. Thus, program 130 is stored in storage 140, and executed by central processing unit 60 via memory 61. Network connection agent programs 71-84 run on servers 11-24, respectively. As described in more detail below, the agent programs query their respective servers to identify which ports are currently being used by the server to listen for communications from other, initiating partners and the identities of the initiating partners. These are "active" connections between the two computers. The agent programs report these ports, their status and their initiating partners to the analysis program 130. The analysis program 130 then records in a central database 140 the ports, their status and their partner servers, and the port sampling time. This forms a snapshot of the active connections, i.e. the ports, their status and their partners at approximately a point in time. Then, the analysis program 130 determines which of these ports may be used for connections between servers to handle requests from various clients. These are considered "persistent connections", and serve as a baseline for troubleshooting because they are presumed to be needed on an time-after-time basis for handling client requests. Other, infrequent/transient connections such as between a client and a server are not considered "persistent" or included in the baseline. If there is a subsequent failure, somewhere in the distributed computer system, an administrator can compare the currently active connections to the baseline, persistent connections, to determine if any of the baseline, persistent connections are missing. If so, this may identify the source of the problem, i.e. one of the two servers between which the persistent connection was made in the past but is not currently active. Upon request by the administrator, the analysis program 130 will display all the connections for a specified server to determine if many of the connections to that server are inactive, but expected from the baseline. If this is the case, this tends to indicate a problem with this server.

FIG. 2 illustrates the foregoing process in more detail. In step 200, the agent programs 71-84 query the operating systems in their respective servers with a known "netstat-an" or equivalent command to identify all open ports for this server, and obtain information about the connections/sessions made through these ports. (The "netstat-an" command is known in the Unix operating system. "Netstat" is an equivalent command known in the Microsoft Windows operating system.) The response to the netstat-an command includes a list of all the open ports for the server, the protocol type (for example, TCP or UDP) used for the connection, local IP address and port number, foreign IP address and port number, and state of the connection/session. The connection "state" represents the status of the respective combination of sockets for the connection. Examples of states are LISTEN, ESTABLISHED, CLOSE_WAIT, and TIME_WAIT. The LISTEN state indicates that the socket is in a listening/service mode, to receive a request from a user or a server application. In the illustrated example, application servers 16, 17 or 18 can make a request to a (listening) server 19-24 for a respective service. The LISTEN state is characteristic of a computer (such as server 19-24) which receives the request and may provide the requested service. Likewise, when one of the proxy servers 11-13 forwards a user request to one of the servers 16-18 (via load balancer server 14), there is a connection between the one proxy server 11-13 and the one server 16-18, and the one server 16-18 is considered the listener in this connection.

The agent program on each server builds a list of listening (socket) ports for that server by selecting records from the response to the netstat-an command where the status is LISTEN and extracting port numbers from these selected records. These are records of ports where the server is playing the role of a providing the requested service. The agent program on each server also builds a list of non listening (socket) ports for that server by selecting records from the response to the netstat-an command where the status is ESTABLISHED, CLOSE_WAIT and the local port is not a listening port and extracting port numbers from these selected records. These are records of ports where the server is playing the role of making or sending the request. The following is an example when the command "netstat-an" is executed on a local server with IP address 9.17.100.10. The following the response:

| Proto | Local Address | Foreign Address | State |
|---|---|---|---|
| tcp | *.50504 | *.* | LISTEN |
| tcp | 9.17.100.10.50504 | 9.100.20.100.1111 | ESTABLISHED |
| tcp | 9.17.100.10.1112 | 9.100.20.101.2000 | ESTABLISHED |

The line with state "LISTEN" indicates that the local server listens on port 50504. The next line with state "ESTABLISHED" indicates a connection between the local server and another, remote server with IP address 9.100.20.100. The local socket for this connection indicates port 50504. The remote socket port is 1111. Because the local port belongs to a listener port list of the local server for this connection, this local server provides a service to a remote server. The next line with state "ESTABLISHED" indicates a connection between this server and another remote server with IP address 9.100.20.101. Local socket for this connection indicates port 1112. The remote socket port is 2000. Because the local port does not belong to the listener port list of the local server, for this connection the local server is requesting a service from the remote server, and the remote server is listening on port 2000.

To determine data flows between the local server and the two remote servers, it is sufficient to analyze data on the local server only. The remote servers will have the opposite connectivity with respect to the local server. However, the agent program running on the remote servers might allow discovery of connectivity between the remote server and still other servers.

There can be and often are multiple open connections between two computers. Some of the connections last for a long time, and others come and go; both types are considered "persistent". If the requesting computer has multiple connections with the servicing computer for the same type of service, all of the requests will use the same socket at the servicing computer, but there will be different sockets at the requesting computer. In one embodiment of the present invention, the agent program on each (local) server lumps together the connections/sessions based on common foreign server and indicates final representation of links (i.e. server address, client address and server port). The "server address" can be local or remote to the local server. The agent programs then send their respective lists to the analysis program 130 in troubleshooting computer 120 (step 204). Alternately, each of the agent programs sends the information obtained via the netstat-an command to the analysis program 130, and the analysis program 130 builds the foregoing lists for each server.

After receiving (or building the foregoing lists), analysis program 130 filters out/deletes, in the following ways, the active connections which are not likely to be persistent, server application to server application connections that should be included in the baseline (step 210). Accordingly, analysis program 130 filters out those active connections presumed by the analysis program 130 to be handling other system functions, i.e. functions unrelated to application handling of client/customer requests. Examples of system functions are time service, logon by an administrator, data backup, network installation management to permit remote configuration and service, remote power reset, FTPing of maintenance files or program updates, transmission of a list of valid UserID/password combinations of administrators, communication of encrypted information for logon of a systems administrator, communication of non encrypted information for logon of a systems administrator, etc. Analysis program 130 has a list of certain types and ranges of port numbers that are typically used to handle these other system functions. For example, system functions typically use an SSH port for encrypted communications for logon of systems administrator, a Telnet port for non encrypted communications for logon of a systems administrator, an FTP port for maintaining files and updating programs, etc. Also, port numbers 1-1024 are typically used for general system function, so analysis program 130 filters out the active-connection records for these ports. Preferably, analysis program 130 also filters out the records for those ports typically used by a server to receive requests directly from the clients (in the illustrated example, client computer 42), such as ports 80 and 443. (Analysis program 130 has a list of such ports.)

After deleting these system function ports and client ports from the database 140 of active connections, the remaining ports (with active connections) are presumed to be used for server application to server application connections pursuant to the client requests (although additional connections may remain in the list). Assuming at this time that no one has notified troubleshooting computer 120 of any outages, analysis program 130 treats the filtered list of active-connection ports as a "base line" or reference list of active connections presumed to be needed to handle normal server-application to server-application functions to handle client requests.

Next, analysis program 130 creates a server-server, active-connection table where one column is for servers whose active port is in the listening mode and another column is for the partner server whose active port is not in the listening mode (step 220). That table is stored in a central database 140. Analysis program 130 ensures uniqueness of records in database. Typically, a server can have several hundred active connections simultaneously, but they can be between just a few servers. So, in one embodiment of the present invention, analysis program 130 treats multiple connections on different ports between the two servers as one directional connection and lumps together all these connections as one line entry in the table. The server-server, active-connection table includes a column indicating a number of sample times when at least one active connection was detected between the listening mode server and the respective partner server, and another column indicating the last sample time when such a connection was detected between the same two servers. In this embodiment of the present invention, the server-server, active-connection table has the following categories:

| Listening server IP address | Partner server IP address | Number of Connections | Latest Connection Time |
|---|---|---|---|

In another embodiment of the present invention, analysis program 130 generates a server-server active connections table with a separate line entry for each listening port of each server and each partner server. This line entry indicates the number of connections between this listening port and the same partner server, and the latest connection time between this listening port and the partner server (in addition to the listening server IP address and partner server IP address). With this added information, connections can be analyzed for particular ports only, like port 80 (HTTP) or port 386 (LDAP) to further aid in troubleshooting. This is helpful because some connections may work in one direction but not others, and the specification of ports will aid in localizing the failure.

During the first iteration of steps 200-220, the "sample number" is set to one for each entry where at least one connection between the corresponding two servers is detected. The foregoing steps 200-220 are repeated at the next agent program sampling time, for example, every ten minutes. After this next iteration of steps 200-220, the current list of server-server, active-connection entries are compared to those in the existing server-server, active-connection connection table (step 234). If there are any detected connections in the current list for a pair of listening server and partner server that do not appear in the existing table, then they are added to the server-server, active-connection table, the sample number is set to one and the time column is set to the current sample time (step 236). If there are any detected connections in the current list for a pair of listening server and partner server that already appear in the existing table, then the sample number is incremented and the time column is set to the current sample time (step 238). Thus, the value of the sample number indicates the persistence of a connection between these two servers, i.e. a connection that is likely used to handle a client request. The entry in the sample time indicated whether this connection is currently active; if not, one of the corresponding servers may be down.

Connections with a high value for the sample number indicate connections that are probably needed for normal handling of client requests, such as connections between two server applications (in different servers), between an application server and a database manager or between an application server and any of servers 20-24. In the example of clients/customers requesting compound travel reservations where the front end server is the interface to the customers, there would likely be high values for the sample numbers for the connections between application servers 16-18 and application server 24 (or other associated servers not shown in FIG. 2) which host an airplane reservation application, a hotel reservation application and a rent-a-car reservation application. There would likely be high values also for the connections between the airplane reservation application, hotel reservation application and rent-a-car reservation application servers and airplane, hotel and rent-a-car database servers, respectively (not shown in FIG. 2).

In step 240, analysis program 130 deletes from the server-server, active-connections table those entries (rows) where the value for the sample number is low, for example, less than once a week or some other interval indicative of an infrequent or irregular connection not associated with handling or normal client requests. For example, an administrator may occasionally test a server using a server application to server application port, such as when running a probe. Such tests occur infrequently and are not associated with normal client requests. Also, if a certain connection has not been active for a predetermined period such as one month, then analysis program 130 deletes this connection from the server-server table. Thus, step 240 represents further filtering to delete those active connections which are not likely to be "persistent".

If there is a problem with the distributed network, the systems administrator can request to see the server-server, active-connections table (decision 244). In response, the analysis program 130 displays the table and highlights those (historically persistent) connections which the latest sampling did not indicate as active (step 250). If one or more of the highlighted entries connections has a high value for the sample number, this may isolate the cause of the problem encountered by the customer, i.e. the listening server or partner server or network between them may be down or for some other reason this connection has been lost. Conversely, if the value of the sample number is high, but the connection has been inactive for a considerable time before the customer complaint, this tends to indicate that this loss of connection does not indicate the source of the customer problem. In some circumstances, the absence of a current connection having a low sample number in the historical table may still indicate a cause of the problem encountered by the customer. For example, if a systems administrator recently switched an application server from one database server to another database server, the sample count for the connection to the new database will be low, but this is nevertheless an important connection.

In some cases also, there is no active connection between two servers at the moment of sampling, but this is not due to a failure of either of these servers. Rather, during normal operation, connections often begin and end. Nevertheless, statistically, this situation will not occur often between two servers that normally cooperate to handle a client request.

Based on the foregoing, a system, method and program for identifying persistent, server-server, active-connections and using such identifications to troubleshoot a failure in a distributed computer system, have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A computer program product for determining active, server-server connections likely needed to handle client requests, said program product comprising:
   a computer readable storage medium;
   first program instructions to repeatedly detect active connections between a first server and other servers; and
   second program instructions to determine a number of times an active connection between said first server and each of said other servers has been detected;
   third program instructions to determine a respective, approximate time when each of said active connections was last detected; and
   fourth program instructions to form a table listing said active connections, said number of times each of said active connections has been detected, and said respective, approximate time when each of said active connections was last detected, said table being available for display to a user troubleshooting a problem with said first server; and wherein
   said first program instructions identify said active connections between said first server and said other servers by detecting a multiplicity of active connections on said first server and filtering out one or more active connections of said multiplicity which utilize ports generally used for system functions; and
   said first, second, third and fourth program instructions are stored on said computer readable storage medium.

2. A computer program product as set forth in claim 1 wherein said fourth program instructions highlight in said table one or more of said active connections which were not detected as active during a most recent iteration by said first program instructions.

3. A computer program product as set forth in claim 1 further comprising fifth program instructions to identify which of said active connections utilize a listening port on said first server; and wherein said fifth program instructions are stored on said computer readable storage medium.

4. A computer program product as set forth in claim 1 wherein said first program instructions identify said active connections between said first server and said other servers by also filtering out one or more active connections of said multiplicity which utilize ports generally used to receive requests from user clients.

5. A method for determining active, server-server connections likely needed to handle client requests, said method comprising the steps of:
   repeatedly detecting active connections between a first server and other servers; and
   determining a number of times an active connection between said first server and each of said other servers has been detected;
   determining a respective, approximate time when each of said active connections was last detected; and
   generating and displaying a table listing said active connections, said number of times each of said active connections has been detected, and said respective, approximate time when each of said active connections was last detected; and wherein
   the step of repeatedly detecting active connections between a first server and other servers comprises the step of detecting a multiplicity of active connections on said first server and filtering out one or more active connections of said multiplicity which utilize ports generally used for system functions.

6. A method as set forth in claim 5 further comprising the step of highlighting in said table one or more of said plurality of said active connections which were not detected as active during a most recent iteration by said first program instructions.

7. A computer system for determining active, server-server connections likely needed to handle client requests, said system comprising:
   a central processing unit and a computer readable memory;
   a computer readable storage media;
   first program instructions to repeatedly detect active connections between a first server and other servers; and second program instructions to determine a number of times an active connection between said first server and each of said other servers has been detected;

third program instructions to determine a respective, approximate time when each of said active connections was last detected; and fourth program instructions to form a table listing said active connections, said number of times each of said active connections has been detected, and said respective, approximate time when each of said active connections was last detected, said table being available for display to a user troubleshooting a problem with said first server; and wherein said first program instructions identify said active connections between a first server and other servers by detecting a multiplicity of active connections on said first server and filtering out one or more active connections of said multiplicity which utilize ports generally used for system functions; and said first, second, third and fourth program instructions are stored on said computer readable storage medium for execution by said central processing unit via said computer readable memory.

8. A computer system as set forth in claim 7 wherein said fourth program instructions highlight in said table one or more of said active connections which were not detected as active during a most recent iteration by said first program instructions.

9. A computer program product as set forth in claim 1 wherein said first program instructions identify said active connections between a first server and other servers by also filtering out one or more active connections of said multiplicity which utilize ports generally used to receive requests from user clients.

10. A method as set forth in claim 5 wherein the step of repeatedly detecting active connections between a first server and other servers further comprises the step of filtering out one or more active connections of said multiplicity which utilize ports generally used to receive requests from user clients.

11. A computer program product as set forth in claim 1 wherein said fourth program instructions group together in said table a plurality of said active connections between said first server and another of said servers.

12. A method as set forth in claim 5 wherein said step of generating and displaying said table listing said active connections, said number of times each of said active connections has been detected, and said respective, approximate time when each of said active connections was last detected comprises the step of grouping together in said table a plurality of said active connections between said first server and another of said servers.

13. A computer system as set forth in claim 7 wherein said fourth program instructions group together in said table a plurality of said active connections between said first server and another of said servers.

* * * * *

UNITED STATES PATENT AND TRADEMARK OFFICE
CERTIFICATE OF CORRECTION

PATENT NO.       : 7,603,459 B2                                    Page 1 of 1
APPLICATION NO.  : 10/940471
DATED            : October 13, 2009
INVENTOR(S)      : Alam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1429 days.

Signed and Sealed this

Fifth Day of October, 2010

David J. Kappos
*Director of the United States Patent and Trademark Office*